United States Patent [19]

Swanson

[11] 3,911,156
[45] Oct. 7, 1975

[54] METHOD OF HANDLING FOODS
[76] Inventor: Alta S. Swanson, 1975 McLean Blvd. NW., Wichita, Kans. 67203
[22] Filed: July 30, 1973
[21] Appl. No.: 384,054

[52] U.S. Cl. .............. 426/393; 426/410; 426/478; 426/524; 426/523
[51] Int. Cl.² ................. A23B 4/06; B65B 55/00
[58] Field of Search .......... 426/392, 393, 524, 410, 426/129

[56] References Cited
UNITED STATES PATENTS

| | | | |
|---|---|---|---|
| 2,111,498 | 3/1938 | Thomas et al. | 426/393 |
| 2,235,209 | 3/1941 | Fletcher | 426/393 |
| 2,598,137 | 5/1952 | Schulz et al. | 426/393 |
| 2,752,252 | 6/1956 | Condon | 426/524 |
| 3,166,425 | 1/1965 | Morrison | 426/393 |

OTHER PUBLICATIONS

Kirk–Othmer, Encyclopedia of Chemical Technology, Second Edition, Vol. 8 pp. 778–780, 782.

Primary Examiner—Norman Yudkoff
Assistant Examiner—D. Sanders
Attorney, Agent, or Firm—John H. Widdowson

[57] ABSTRACT

A process for handling foods comprising preparing the foods by cooking, placing the cooked foods in a compartmentalized zone, and subsequently freezing the cooked foods within the compartmentalized zone. The frozen cooked foods are thereafter removed and repackaged in a packaging zone. The packaging zone may be stored in a freezing zone until the foods are needed for human consumption.

2 Claims, 4 Drawing Figures

METHOD OF HANDLING FOODS

BACKGROUND OF THE INVENTION

1. Field of the Invention

This invention is related to a process for handling foods. More specifically, this invention provides a process for handling prepared foods for preservation and future consumption.

2. Description of the Prior Art

Conventional methods of handling foods relate to items which are normally individually packaged and stored prior to cooking, or relate to frozen confections, such as ice cream, which have been frozen in a compartment type structure, removed therefrom and subsequently stored in a freezer. The major deficiency associated with freezing prior to preparing foods, especially vegetables and meats, is that the esters of fatty acids with glycerol, commonly known as vegetable and animal oils or fats, are contained within the prepared goods at the time of human consumption. These fatty acids have had no chance to separate from the prepared foods because generally there has to be a decrease in temperature of the prepared foods for the fats contained therein to coagulate into an upper layer resting on top of the prepared foods. An abundance of fatty acids within prepared foods can not only cause the foods to be somewhat unsavory, but they can also lead to insalubrity when consumed over a period of time by humans.

Another major deficiency associated with the prior art methods is that generally the majority of foods when frozen should be completely thawed out before cooking in order to prevent a flavor distortion. This is especially true of meats, and the like, because of their tendency while cooking to cook quicker on the exterior than on the interior. A frozen piece of meat cooked over a hot fire usually burns on the outside while remaining raw and uncooked on the inside. Therefore, what is needed and what has been invented by me is a novel method of handling foods which does not include the deficiencies associated with the prior art and one which is not taught nor suggested by any of the prior art methods, either taken singly or in combination.

SUMMARY OF THE INVENTION

The present invention accomplishes its desired objects by broadly providing a process for handling foods which comprises preparing the foods by cooking, placing the cooked foods in a compartmentalized zone, and subsequently freezing the foods within the compartmentalized zone. The process additionally includes removing the frozen cooked foods from the compartmentalized zone, repackaging the removed cooked frozen foods in a packaging zone, and placing the repackaged foods into a freezing zone for storage until the foods are needed for human consumption.

It is therefore an object of this invention to provide a novel process for handling foods which when prepared for human consumption do not include the quantity of fatty acids which is associated with foods prepared by the prior art methods.

It is another object of this invention to provide a novel process for handling cooked foods which when consumed are more healthy than foods consumed when prepared by conventional methods.

It is yet another object of this invention to provide a process for handling foods which is relatively economical to perform and more expeditious for preparing the foods for human consumption than the methods associated with the prior arts.

There, together with various ancillary objects and features which will become apparent as the following description of this novel process proceeds, the preferred devices being shown in the accompanying drawings for performing the novel process, by way of example only, wherein:

DETAILED DESCRIPTION OF THE INVENTION

Figure 1:
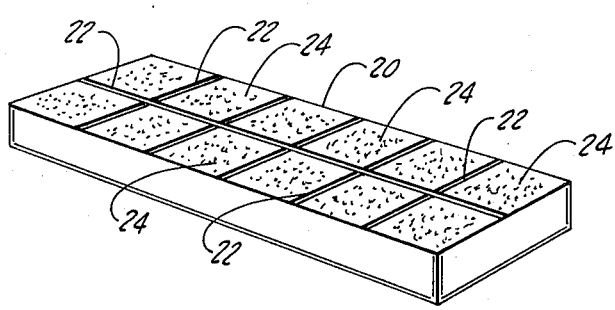
FIG. 1 is a perspective view of a conventional ice cube tray having frozen cooked foods deposited therein.
Figure 2:
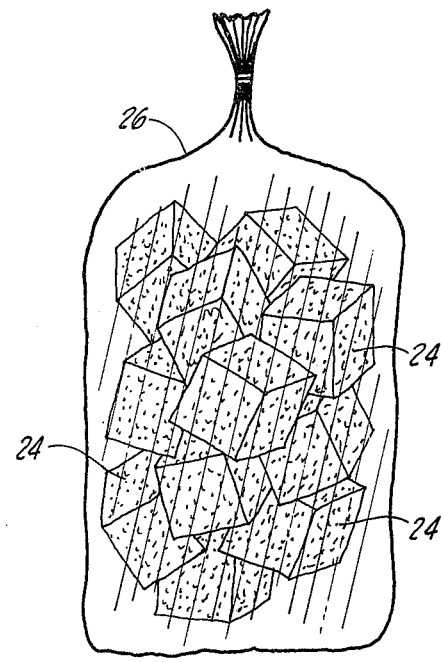
FIG. 2 is a perspective view of a plastic bag including the cubical frozen cooked foods removed from the ice cube tray of FIG. 1.
Figure 3:
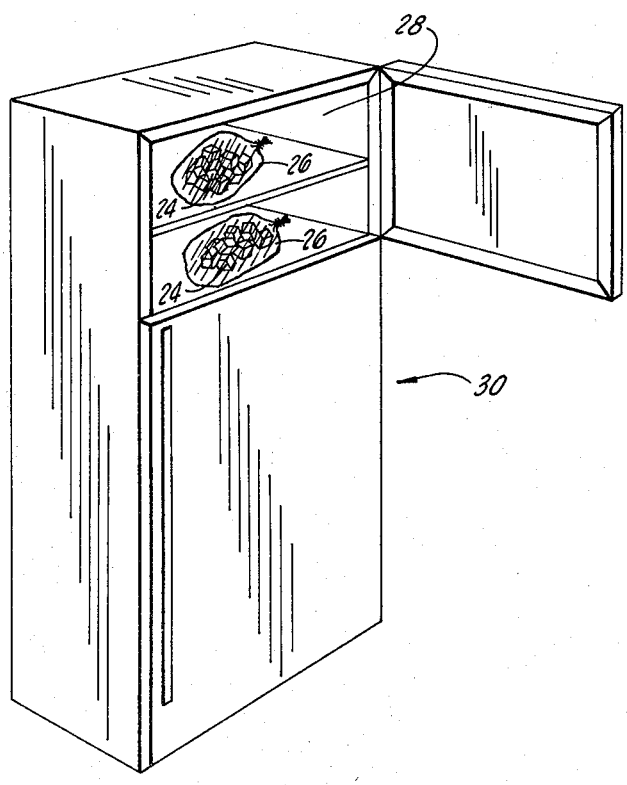
FIG. 3 is a perspective view of a pair of plastic bags containing the cubical frozen prepared foods and being sheltered within a freezer of a conventional refrigerator.
Figure 4:
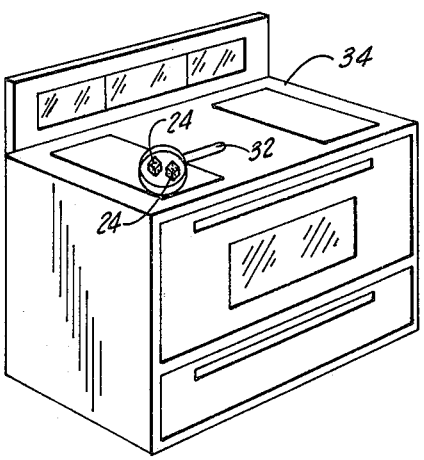
FIG. 4 is a perspective view of a conventional stove heating a frying pan containing the cubical frozen cooked foods.

Referring in detail now to the drawing, wherein like or similar parts of the devices for performing the novel process are identified by like reference numerals, an ice cube tray 20 includes a plurality of partitions 22 which form a number of compartmentalized zones wherein foods 24 may be placed and frozen. The foods 24 are cubically shaped when frozen and removed from ice cube tray 20, and may be subsequently repackaged in a plastic bag 26 for storage in a freezer 28 of a refrigerator, generally illustrated as 30. When frozen foods 24 are needed for human consumption, they may be removed from the plastic bag 26 within freezer 28 and placed in a frying pan 32 and heated on a stove 34 until melted.

With continuing reference to the drawings for illustration of my novel process for handling foods, foods 24 may be either initially prepared by cooking on a stove 34, or they may be purchased in a prepared and cooked state (e.g. "Sloppy Joe" sandwich mix). When preservation for future human consumption is desired, foods 24 should be placed in a compartmentalized zone, such as in a conventional ice cube tray 20, and frozen by freezer 28. Foods 24 may be removed from the compartmentalized zone and repackaged within any suitable packaging zone, such as plastic bag 26, and subsequently stored within the freezing zone of freezer 28. The compartmentalized zone is now available to be re-used for the placing of additional prepared foods 24 for freezing. When human consumption is desired, frozen foods 24 may be removed from plastic bag 26 and immediately prepared for eating by directly placing into the frying pan 32 without having to initially thaw out foods 24. The smaller the compartmentalized zones are the quicker the foods 24 will be available for eating because of the increased surface area per unit volume coming in contact with the heat. Preparing foods 24 by directly placing frozen foods 24 into frying pan 32 will not distort the flavor because the foods 24 have already been cooked. However, as with unprepared foods, the frozen prepared foods 24 may be initially thawed prior to heating after removal from the plastic bag 26.

I have found that this process is ideally suited for foods containing vegetable or animal oils, which are basically esters of fatty acids with glycerol. My novel process will work with foods containing any quantity of fatty acids. However, I have found that the process best works with foods having between about 0.2% weight fatty acids and about 35% weight fatty acids. The fatty acids may be of the saturated or unsaturated type and/or mixtures thereof.

The saturated fatty acids should include between about 4 and 26 carbon atoms and may be any of the saturated fatty acids such as those selected from the group consisting of palmitic, lauric, myristic, stearic, caproic, caprylic, butyric, capric, and mixtures thereof. These saturated fatty acids have a melting point between about −4°C and 95°C. The more preferred saturated fatty acids are those (e.g. caprylic, capric, lauric, myristic and palmitic) whose melting point is between about 15°C and about 60°C because between these temperatures the saturated fatty acids can be easily separated from the frozen foods 24 after they are removed from the compartmentalized zones of ice cube tray 20.

The unsaturated fatty acids should include between about 10 and 24 carbon atoms and may be any of the unsaturated fatty acids such as those selected from the group consisting of linolenic, oleic, petroselinic, erucic, nervonic, linoleic, gadoleic, cetoleic and the mixtures thereof. These unsaturated fatty acids have a melting point between about 10°C and 50°C. The more preferred unsaturated fatty acids are those (e.g. oleic, petroselinic, erucic, nervonic) whose melting point is between about 15°C and about 40°C because between these temperatures, as was the case for the saturated fatty acids, the unsaturated fatty acids can be easily separated from frozen foods 24 after they are removed from the ice cube tray 20.

The removal of the saturated and unsaturated fatty acids may be performed at any time prior to heating for human consumption but is preferably performed prior to repackaging. It is best accomplished by taking a knife, or the like, and merely cutting or chipping of the top layer of the frozen saturated and unsaturated fatty acids from the individual frozen cubical foods 24. There is usually a clear definable point of separation between the upper layer of fatty acids and the lower layer of frozen foods 24 containing a substantially less amount of the fatty acids. Thus, after removing the frozen saturated and unsaturated fatty acids, there remains frozen cubical foods 24 which when heated and eaten are healthier than foods prepared by conventional methods because they essentially cause no cholesterol build up and premature hardening of the arteries.

While the present invention has been described herein with reference to particular embodiments thereof, a latitude of modification, various changes and substitutions are intended in the foregoing disclosure, and in some instances some features of the invention will be employed without a corresponding use of other features without departing from the scope of the invention as set forth.

I claim:

1. A process for handling prepared foods comprising:
a. placing said prepared foods in a compartmentalized zone, said foods include up to about 35% wt. fatty acids and said fatty acids are selected from the group consisting of saturated fatty acids, unsaturated fatty acids, and mixtures thereof, said saturated fatty acids, have a melting point between about −4°C and 95°C, and said saturated fatty acids include between about 4 and about 26 carbon atoms and are selected from the group consisting of palmitic, lauric, myristic, stearic, caproic, caprylic, butyric, capric, and mixtures thereof, said unsaturated fatty acids have a melting point between about 10°C and 50°C, and said unsaturated fatty acids include between about 10 and 24 carbon atoms and are selected from the group consisting of linolenic, oleic, petroselinic, erucic, nervonic, linoleic, gadoleic, cetoleic, and mixtures thereof;
b. freezing said prepared foods with said compartmentalized zone, said compartmentalized zone is an ice cube tray;
c. removing said frozen foods of step (b) from said compartmentalized zone; and
d. repackaging said removed prepared frozen foods of step (c) in a packaging zone, said repackaging zone is a plastic bag; and
e. said process additionally including separating said saturated and unsaturated fatty acids from said removed prepared frozen foods of step (c) and placing said repackaged foods of step (d) in a freezing zone;
f. said process additionally including re-using said compartmentalized zone of step (c) for placing of additional prepared foods for freezing; and
g. said process additionally including removing said repackaged food from said freezing zone, and heating said removed repackaged foods for human consumption.

2. A process for handling foods comprising:
a. cooking said foods in a heating zone, said foods include up to about 35% wt. fatty acids, and said fatty acids are selected from the group consisting of saturated fatty acids, unsaturated fatty acids, and mixtures thereof, said saturated fatty acids have a melting point between about −4°C and 95°C and said saturated fatty acids include between about 4 and about 26 carbon atoms, and are selected from the group consisting of palmitic, lauric, myristic, stearic, caproic, caprylic, betyric, capric and mixtures thereof, said unsaturated fatty acids include a melting point between about 10°C and 50°C and said unsaturated fatty acids include between about 10 and 24 carbon atoms and are selected from the group consisting of linolenic, oleic, petroselinic, erucic, nervonic, linoleic, gadoleic, cetoleic, and mixtures thereof;
b. placing said cooked foods of step (a) in a compartmentalized zone, said compartmentalized zone is an ice cube tray;
c. freezing said cooked foods within said compartmentalized zone;
d. removing said frozen foods of step (c) from said compartmentalized zone; and
e. repackaging said removed cooked frozen foods of step (d) in a packaging zone, said repackaging zone is a plastic bag; and
f. said process additionally including separating said saturated and unsaturated fatty acids from said removed cooked frozen foods of step (d) and placing said repackaged foods of step (e) in a freezing zone;

g. said process additionally including re-using said compartmentalized zone of step (d) for placing of additional cooked foods for freezing; and h. said process additionally including removing said repackaged food from said freezing zone, and heating said removed repackaged foods for human consumption.

* * * * *